(12) United States Patent
Goyal et al.

(10) Patent No.: US 10,565,798 B2
(45) Date of Patent: Feb. 18, 2020

(54) GLOBE, AND A METHOD AND A SYSTEM FOR ENABLING AUGMENTED REALITY INTERACTIONS WITH A GLOBE

(71) Applicant: Mobilizar Technologies Private Limited, Karnataka (IN)

(72) Inventors: Vivek Goyal, Karnataka (IN); Dinesh Advani, Karnataka (IN)

(73) Assignee: Mobilizar Technologies Private Limited, Bengaluru, Karnataka (IN)

( * ) Notice: Subject to any disclaimer, the term of this patent is extended or adjusted under 35 U.S.C. 154(b) by 0 days.

(21) Appl. No.: 15/899,498

(22) Filed: Feb. 20, 2018

(65) Prior Publication Data

US 2019/0156580 A1 May 23, 2019

(30) Foreign Application Priority Data

Nov. 17, 2017 (IN) .............................. 201741041096

(51) Int. Cl.
*G06T 19/00* (2011.01)
*G09B 27/08* (2006.01)
*G06F 3/16* (2006.01)

(52) U.S. Cl.
CPC ............ *G06T 19/006* (2013.01); *G06F 3/167* (2013.01); *G09B 27/08* (2013.01)

(58) Field of Classification Search
CPC ...................................................... G06F 3/167
See application file for complete search history.

(56) References Cited

U.S. PATENT DOCUMENTS

| 5,057,024 A * | 10/1991 | Sprott | G09B 27/08 362/809 |
| 5,519,809 A * | 5/1996 | Husseiny | G09B 27/08 362/363 |
| 2007/0247439 A1* | 10/2007 | Daniel | G06F 1/1601 345/173 |
| 2008/0020358 A1* | 1/2008 | Keith | G09B 27/08 434/130 |
| 2017/0004651 A1* | 1/2017 | Xiong | G06F 1/1605 |

FOREIGN PATENT DOCUMENTS

CN 101009056 A * 8/2007

* cited by examiner

*Primary Examiner* — Jitesh Patel

(57) ABSTRACT

A method for enabling augmented reality interactions with a globe comprises steps of receiving an image of a portion of an outer shell of the globe, from an image capturing device of a computing device, identifying a geographical region from the image, generating a plurality of graphical elements related to the geographical region and displaying the plurality of graphical elements on a display device of the computing device.

6 Claims, 15 Drawing Sheets

US 10,565,798 B2

GLOBE, AND A METHOD AND A SYSTEM FOR ENABLING AUGMENTED REALITY INTERACTIONS WITH A GLOBE

FIELD OF THE INVENTION

The present invention generally relates to augmented reality-based learning and gaming and more specifically to a globe, and a method and a system for enabling augmented reality interactions with a globe.

BACKGROUND ART

Globe has been around for more than five centuries but has not changed much, except the boundaries between nations. The level of engagement, information and interactivity that a traditional globe of nineteenth or twentieth century provides is not enough today to engage kids and learn from. Globe has a lot of information printed on its outer shell. Kids have to recognize and memories the oceans, continents, countries within each continent. Even if the kids recognize the countries or their names, they always have to manually turn the globe and find a particular country. This makes it difficult for the kids to learn. Major problem is that the interactive learning environment is missing in the current situation.

Therefore, in light of the discussion above, there is need for a globe, and a method and a system for enabling augmented reality interactions with the globe.

Any discussion of the background art throughout the specification should in no way be considered as an admission that such background art is prior art nor that such background art is widely known or forms part of the common general knowledge in the field.

SUMMARY OF THE INVENTION

The present invention is described hereinafter by various embodiments. This invention may, however, be embodied in many different forms and should not be construed as limited to the embodiment set forth herein. Rather, the embodiment is provided so that this disclosure will be thorough and complete and will fully convey the scope of the invention to those skilled in the art.

Embodiments of the present invention aim to provide a globe, and a method and a system for enabling augmented reality interactions with the globe. With the present invention described here, the Globe is brought to the twenty-first century. The Augmented Reality (using household smart devices like smart phones, tablets or head mounted devices, audio control and self-rotation features allow infinite learning and playtime value for kids and adults alike.

In accordance with an embodiment of the present invention, a globe includes an outer shell, a rotation mechanism provided with an actuator, a microphone and a control module. The microphone is configured to receive an audio signal. The control module is configured to transmit an actuation signal to the actuator, in response to the microphone receiving the audio signal. The actuator is configured to actuate on receiving the actuation signal and cause the outer shell to rotate, using the rotation mechanism.

In accordance with an embodiment of the present invention, the outer shell is a hollow shell made up of a material selected from a metal or a light weight polymer.

In accordance with an embodiment of the present invention, the outer shell has an outer surface, the outer surface includes a map of the world having a plurality of geographical regions marked out.

In accordance with an embodiment of the present invention, the geographical regions are selected from the group comprising oceans, continents, countries, states, cities, mountain ranges, plateaus, grasslands and rivers.

In accordance with an embodiment of the present invention, a method for enabling augmented reality interactions with a globe, comprises steps of receiving an image of a portion of an outer shell of the globe, from an image capturing device of a computing device, identifying a geographical region from the image, generating a plurality of graphical elements related to the geographical region and displaying the plurality of graphical elements on a display device of the computing device.

In accordance with an embodiment of the present invention, the outer shell is a hollow shell made up of a material selected from a metal or a light weight polymer.

In accordance with an embodiment of the present invention, the outer shell has an outer surface, the outer surface includes a map of the world having a plurality of geographical regions marked out.

In accordance with an embodiment of the present invention, the geographical regions are selected from the group comprising oceans, continents, countries, states, cities, mountain ranges, plateaus, grasslands and rivers.

In accordance with an embodiment of the present invention, the plurality of graphical elements includes one or more of 2-Dimensional (2D) and 3-Dimensional (3D) illustrations of entities selected from a group comprising animals, monuments, national flags, landmarks, inventions and foods related to the geographical regions.

In accordance with an embodiment of the present invention, the method further comprises a step of displaying information related to the plurality of graphical elements on the display device of the computing device.

In accordance with an embodiment of the present invention, a system for enabling augmented reality interactions with a globe, comprises an imaging module, an image processing module, a graphics generation module and an interface module. The imaging module is configured to receive an image of a portion of an outer shell of the globe, from an image capturing device of a computing device. The image processing module is configured identify a geographical region from the image. The graphics generation module is configured to generate a plurality of graphical elements related to the geographical region. The interface module is configured to display the plurality of graphical elements on a display device of the computing device.

In accordance with an embodiment of the present invention, the outer shell is a hollow shell made up of a material selected from a metal or a light weight polymer.

In accordance with an embodiment of the present invention, the outer shell has an outer surface, the outer surface including a map of the world having a plurality of geographical regions marked out.

In accordance with an embodiment of the present invention, the geographical region is selected from the group comprising oceans, continents, countries, states, cities, mountain ranges, plateaus, grasslands and rivers.

In accordance with an embodiment of the present invention, the plurality of graphical elements includes one or more of 2-Dimensional (2D) and 3-Dimensional (3D) illustrations of entities selected from a group comprising animals, monuments, national flags, landmarks, inventions and foods related to the geographical regions.

In accordance with an embodiment of the present invention, the interface module is further configured to display information related to the plurality of graphical elements on the display device of the computing device.

BRIEF DESCRIPTION OF THE DRAWINGS

At least one example of the invention will be described with reference to the accompanying drawings, in which.

It should be noted that the same numeral represents the same or similar elements throughout the drawings.

DETAILED DESCRIPTION OF THE EMBODIMENTS

Throughout this specification, unless the context requires otherwise, the words "comprise", "comprises" and "comprising" will be understood to imply the inclusion of a stated step or element or group of steps or elements but not the exclusion of any other step or element or group of steps or elements.

Any one of the terms: "including" or "which includes" or "that includes" as used herein is also an open term that also means including at least the elements/features that follow the term, but not excluding others.

A globe represents a map of the world on a spherical outer shell. However, due to size constraints, an amount of information that can be maintained on the globe is rather limited. However, there may be other different sources such as online repositories, directories, encyclopedias and other sources which may hold much more information with regards to various geographical regions illustrated on the globe. The present invention intends to integrate the different sources with the information presented on a conventional globe, while adding additional functionalities to the globe to convert a conventional globe into a globe.

It is in this regard that the present invention has been elucidated with help of an exemplary environment discussed below. However, a person skilled in the art would appreciate that the present invention is not limited to the exemplary environment, and many variations to the implementation of the present invention is possible, without departing from the scope of the present invention.

Figure 1A:
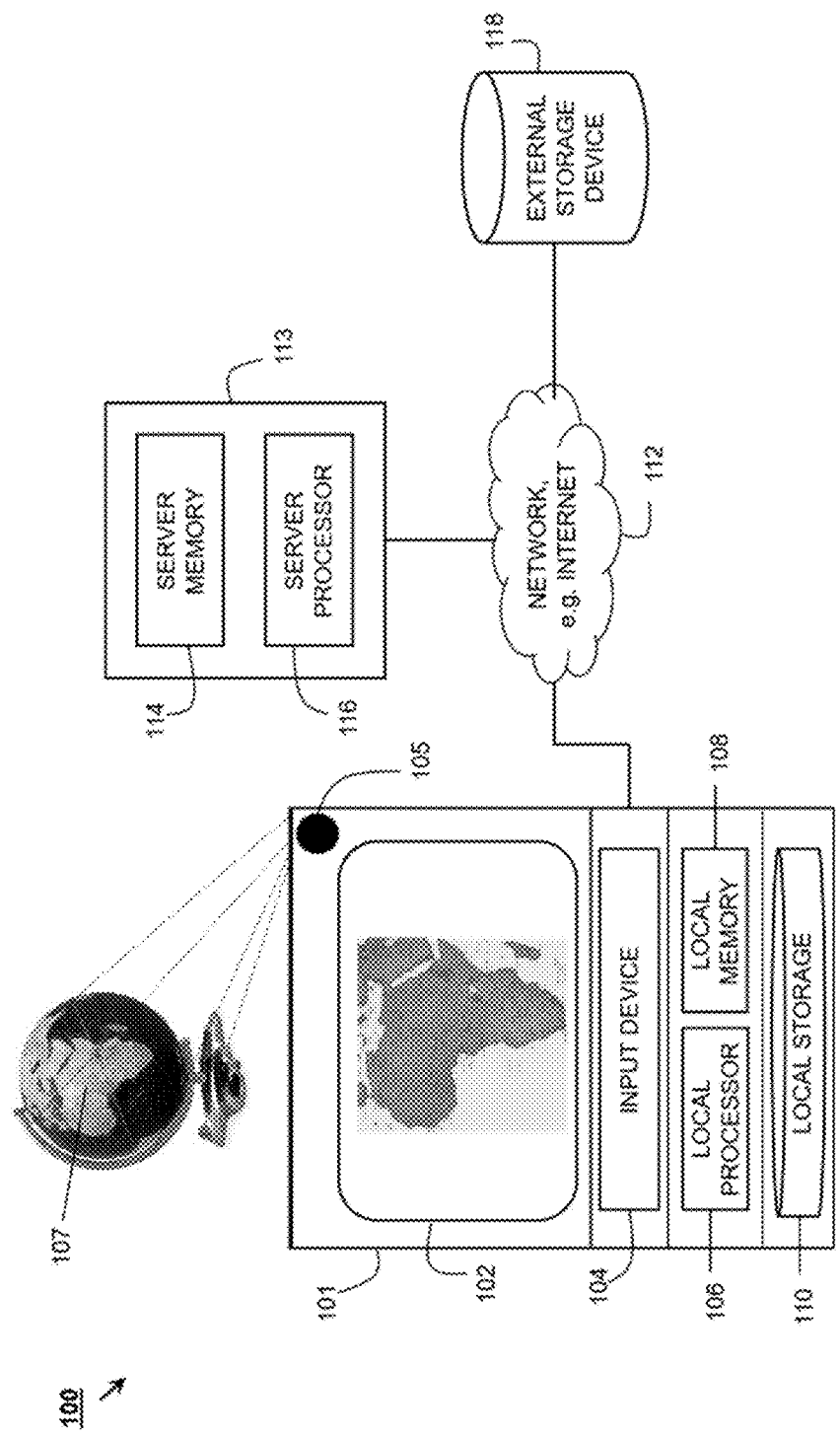
FIG. 1A illustrates an exemplary environment to which various embodiments of the present invention may be implemented.

FIG. 1A illustrates an exemplary environment 100 to which various embodiments of the present invention may be implemented. The environment 100 comprises a computing device 101 associated with a user. In various embodiments of the invention, the computing device 101 is selected from a group of a mobile handheld device, a PDA, a personal computer (such as a desktop or a laptop) or a tablet etc. The computing device 101 comprises a display device 102. The display device 102 may be one of, but not limited to, an LCD screen or an LED screen. Additionally, the computing device 101 includes an input device 104. In various embodiments, the input device 104 is one of, but not limited to, a keypad, a joystick, a mouse and a trackball etc. In various other embodiments, the display device 102 and the input device 104 have been integrated into a capacitive or a resistive or an equivalent touch-based screen device. The computing device 101 also included an image capturing device 105, such a camera or a combination of one or more cameras.

The computing device 101 is envisaged to have further computing capabilities, such as, a local processor 106 and a local memory 108. In various embodiments, the local processor 106 is one of, but not limited to, Field Programmable Gate Array (FPGA), Application Specific Integrated Circuit (ASIC), general purpose or an ARM based processor. Additionally, the local memory 108 is one of, but not limited to, EPROM, EEPROM and Flash memory etc. The computing device 101 is envisaged to have additional storage capabilities in form of additional local storage 110. The local storage 110 is envisaged to store reference data, at least in part, in the computing device 101, for the user's access. The reference data here is envisaged to include data such as data relevant to various geographical locations across the world including images, text, media etc. of monuments, famous landmarks, rivers, political scenarios, economic scenarios, population data, cultural information, occupational information etc. The reference data may be sourced from various online and offline sources such as image repositories, mapping services, encyclopedias, local governing bodies, international forums and their online and offline journals and libraries etc.

The computing device 101 is connected to a network 112. The network 112 is one of, but not limited to, a Local Area Network (LAN) or a Wide Area Network (WAN) implemented through a number of protocols, such as but not limited to, 802.x, Bluetooth, ZigBee or the like. Preferably, the network 112 is Internet. Further connected to the network 112 is a central server 113. The central server 113 is envisaged to have computing capabilities such as a server memory 114 and a server processor 116. In various embodiments, the server processor 116 is one of, but not limited to, Field Programmable Gate Array (FPGA), Application Specific Integrated Circuit (ASIC), general purpose or an ARM based processor. Additionally, the server memory 114 is one of, but not limited to, EPROM, EEPROM and Flash memory etc. An external storage device 118 connected with the network 112 is also envisaged to include at least a portion of reference data (or completely). The external storage device may be a local storage device or a cloud-based storage device. When any portion of the reference data is requested at the computing device 101 (for example, by a browser application of a standalone application, for the purposes of the present invention), the central server 113 fetches the portion of the reference data from the external storage device 118 and delivers the portion to the computing device 101 through the network 112. Further illustrated in FIG. 1A is a globe 107, of which an image is being captured by the image capturing device 105.

Figure 1B:
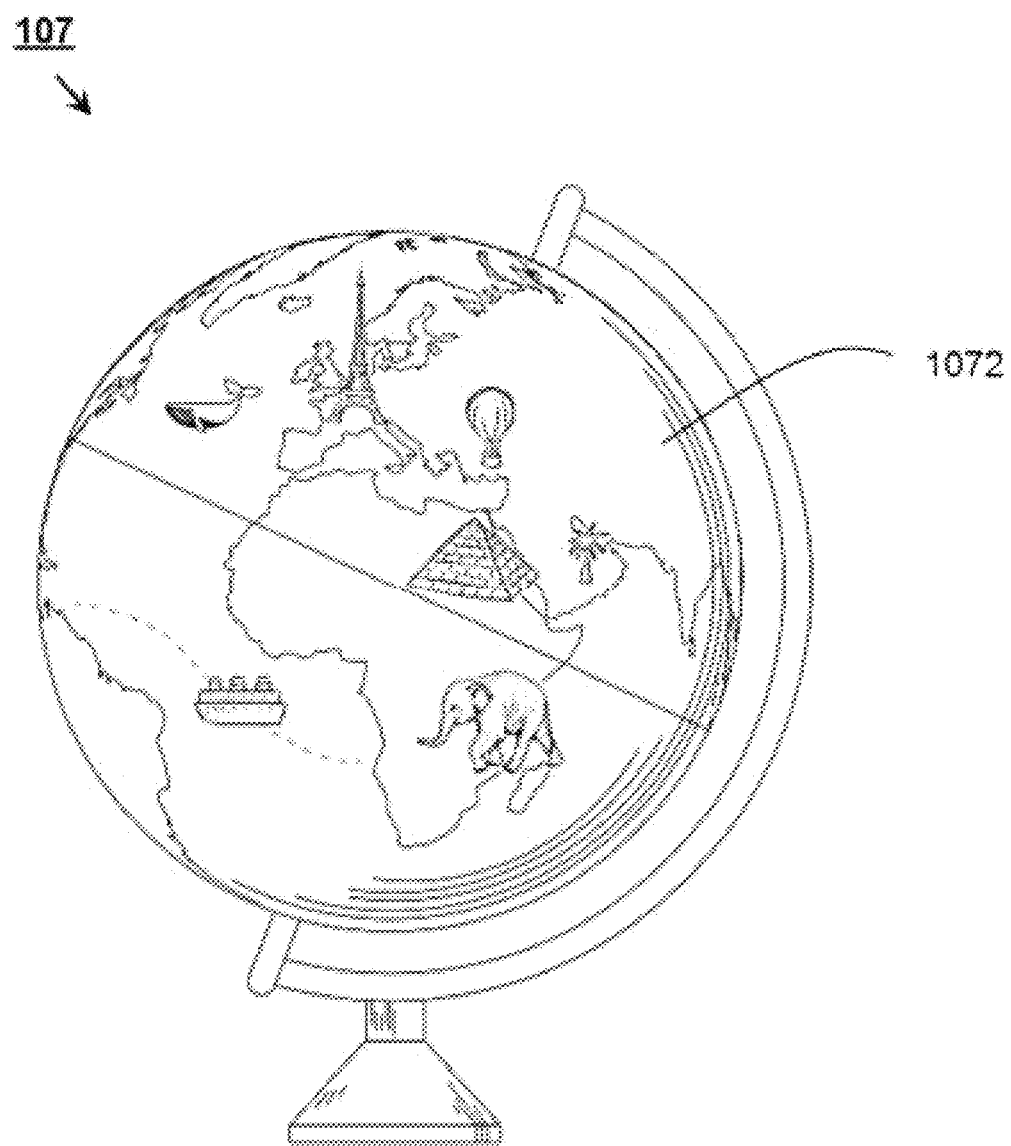
FIG. 1B illustrates a side sectional view of a globe, in accordance with an embodiment of the present invention.
Figure 1C:
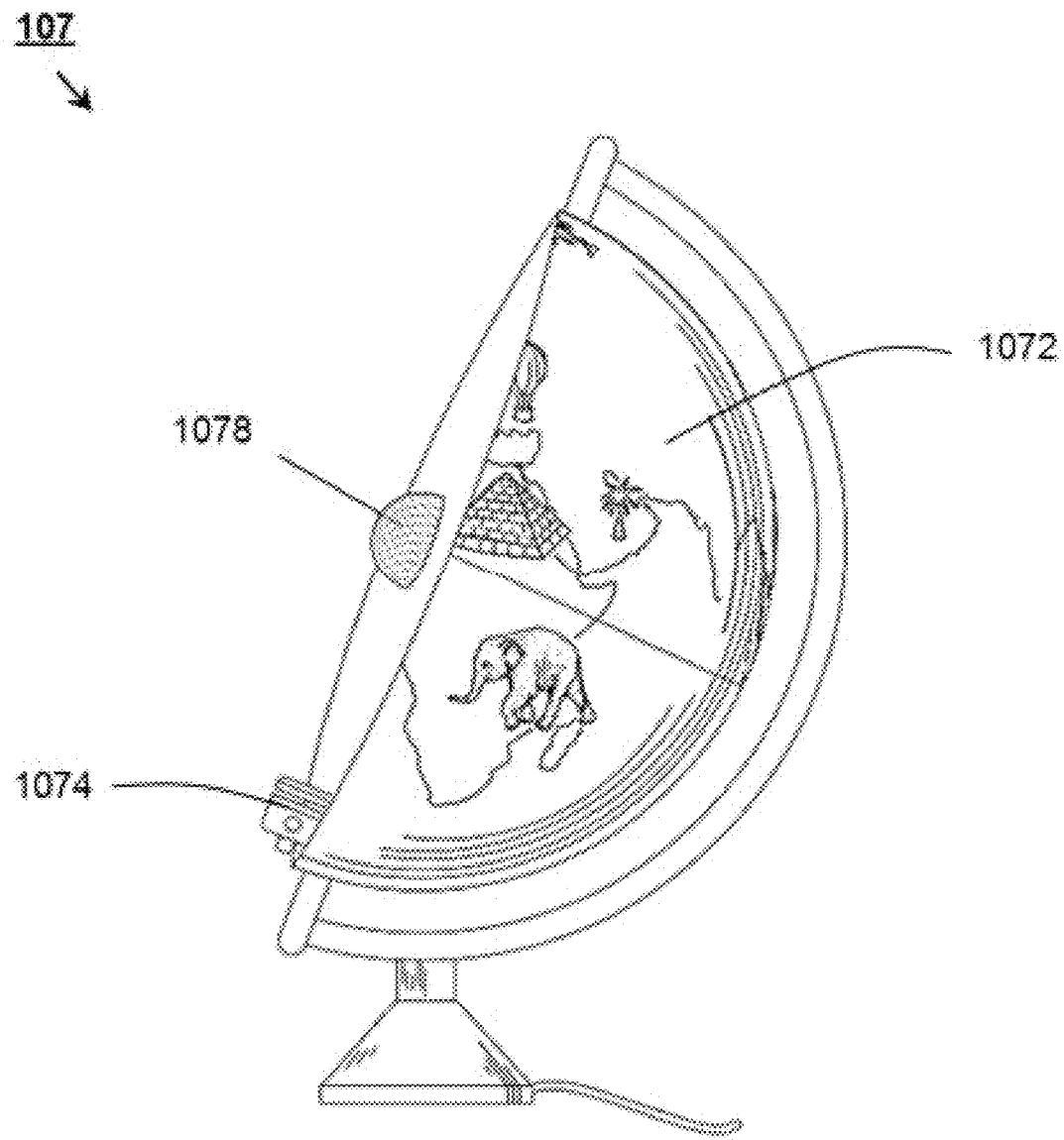
FIG. 1C illustrates a side cross-sectional view of a globe, in accordance with an embodiment of the present invention.

As shown in FIG. 1B, the globe 107 includes an outer shell 1072. The outer shell 1072 may be a hollow shell made up of metal or a light weight polymer. An outer surface of the outer shell 1072 is envisaged to include a map of the world having various geographical regions (such as oceans, continents, countries, states, cities, mountain ranges, plateaus, grasslands, rivers etc.) marked out. FIG. 1C illustrates a side sectional view of the globe 107, in accordance with an embodiment of the present invention. As shown in FIG. 1C, a rotation mechanism 1074 provided with an actuator 1076 (not shown) is located inside of the outer shell 1072. The actuator 1076 may be a D.C. motor. Further, a microphone 1078 has been provided within the outer shell 1072. Also, a control module not shown has been provided within the outer shell 1072.

The microphone 1078 is configured to receive an audio signal. The audio signal may be received from the user or from the computing device 101 or any other device. Further, the audio signal may include a word identifying a geographical region, such as a name of a city or a mountain range or an ocean or a country or a state etc. The control module is configured to transmit an actuation signal to the actuator 1076, in response to the microphone 1078 receiving the audio signal. The actuator 1076 is configured to actuate on receiving the actuation signal and cause the outer shell 1072 to rotate, using the rotation mechanism 1074. In that manner, if a user speaks 'Africa' or an audio command from a speaker of the computing device 101 includes the word 'Africa', the outer shell 1072 would be rotated in order to point a map of Africa, towards the user or the computing device 101, as the case may be. Embodiments of the present invention can now be understood with the exemplary environment 100 as a reference. It is to be noted here that although the embodiments of the method have been described here using the globe 107 having automation features such as the microphone 1078 and the actuation mechanism 1074, a conventional globe with just an outer shell having geographical regions marked out on the outer shell, would also be applicable, to varying extents, for various embodiments of the method described below, for example where the automation features are not implicitly required.

Figure 2:
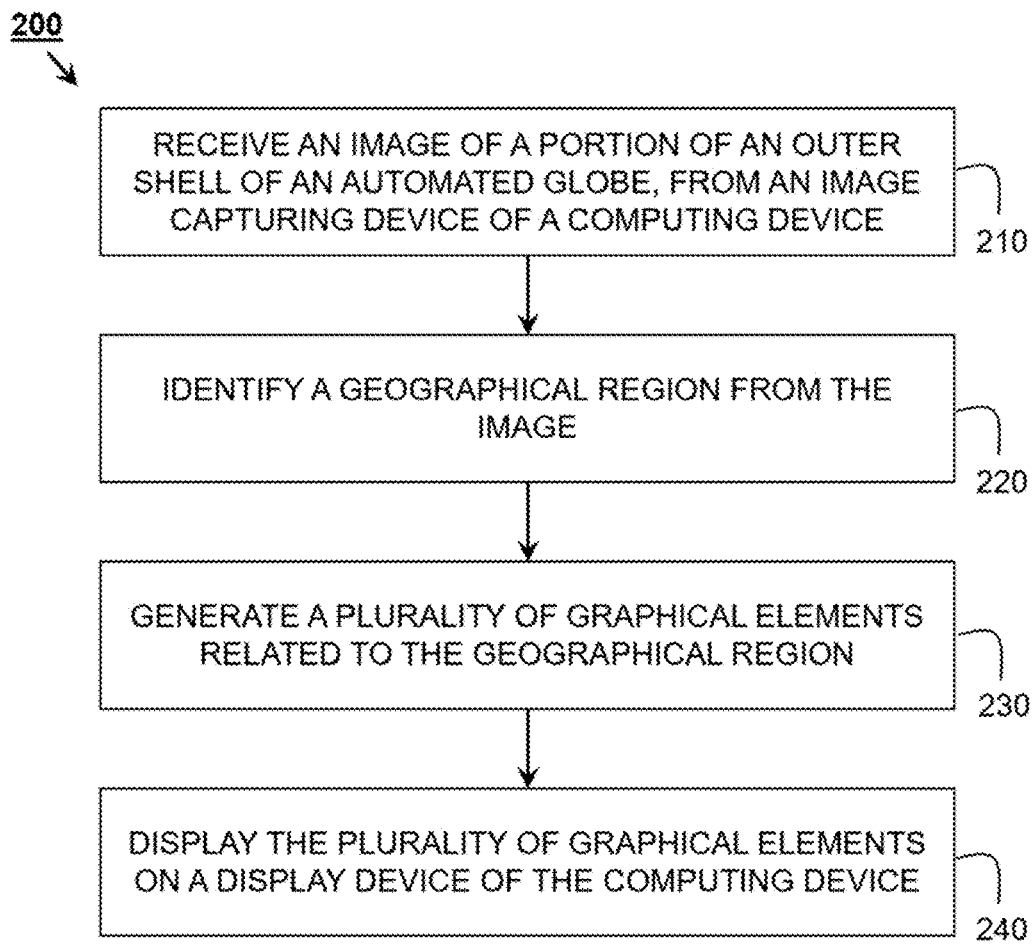
FIG. 2 illustrates a method for enabling augmented reality interactions with a globe, in accordance with an embodiment of the present invention.

FIG. 2 illustrates a method 200 for enabling augmented reality interactions with the globe 107, in accordance with an embodiment of the present invention. The method begins at step 210 by receiving an image of a portion of the outer shell 1072 of the globe 107, from the image capturing device 105. The image may either be stored locally inside the local storage 110 and/or may be transmitted to the central server 113 for storage in the external storage device 118, through the network 112.

At step 220, a geographical region is identified from the image. Again, the geographical region may be identified locally at the computing device 101 or at the central server 113. The geographical region may be identified by comparing the image with the reference data. Further different image recognition algorithms may be used to compare various points in the image, as well as any textual information, with the reference data, to identify the geographical region. One such algorithm may include sampling of a predetermined number of points along a boundary defining the geographical region to recreate the boundary, internally, in a digital form. The digital form may then be compared with the reference data to identify the geographical region. Any form of textual information present of the geographical region may be helpful in identification of the geographical region. For example, a country may have the very name of the country or names of major cities marked out, an ocean might have well known islands and archipelagos marked out.

In one embodiment of the invention, if no geographical region is being identified from the image, an alert may be provided to the user, in form of a text or voice notification for example. The user may then reorient the computing device 101 and/or the globe 107, so that a more accurate and/or appropriate image of the portion of the outer shell 1072 may be captured.

At step 230, a plurality of graphical elements related to the geographical region, are generated. It is envisaged here, that the plurality of graphical elements includes one or more of 2-Dimensional (2D) and 3-Dimensional (3D) illustrations of entities selected from a group comprising animals, monuments, national flags, landmarks, inventions and foods related to the geographical regions. For example, if the identified geographical region is 'Paris' city, a 2-Dimensional (2D) view (or an Orthogonal view) or a 3-Dimensional 3D view (or a Perspective or an Isometric View) of Eiffel Tower may be generated. In another example, if the identified geographical region is 'Egypt', a 2D or a 3D view of Sphinx or Pyramids may be generated. Again, the plurality of graphical elements may be generated at the computing device 101 and/or the central server 113.

At step 240, the plurality of graphical elements is displayed at the display device 102 of the computing device 101. In various embodiments, the plurality of graphical elements is displayed at the display device 102, in a manner that they appear to be located upon the geographical region of the globe 107. For example, the plurality of graphical elements may be angularly oriented, in a manner, that they appear to be normal to a curved outer shell 1072 of the globe 107. This gives a feeling or appearance of the plurality of graphical elements to be actually, originating from or located on the globe 107, in the 3-Dimensional space. Hence the term "augmented reality". Another point to be noted about the plurality of graphical elements is that the entities such animals, monuments, national flags, landmarks, inventions and foods, in themselves constitute different categories. Therefore, the plurality of graphical elements may be divided into a plurality of categories, and one or more categories may be displayed on selection. This would prevent overcrowding of screen space of the display device 102 and allow for greater clarity while viewing of the plurality of graphical elements.

Additionally, other information such as media or text (historical or cultural information) related to the plurality of graphical elements may also be displayed at the display device 102. It is envisaged here, that in some embodiments, the information may be displayed concurrently, while the plurality of graphical elements is being displayed. In various alternate embodiments, the information is displayed on selection (by use of the input device 104) of any one or more of the plurality of graphical elements. The information may also be arranged in a cascading manner, that is one piece of information leading to another (via a hyperlink, for example), so that more and more information can be associated and displayed with any graphical element, without using a lot of the screen space of the display device 102.

Figure 3:
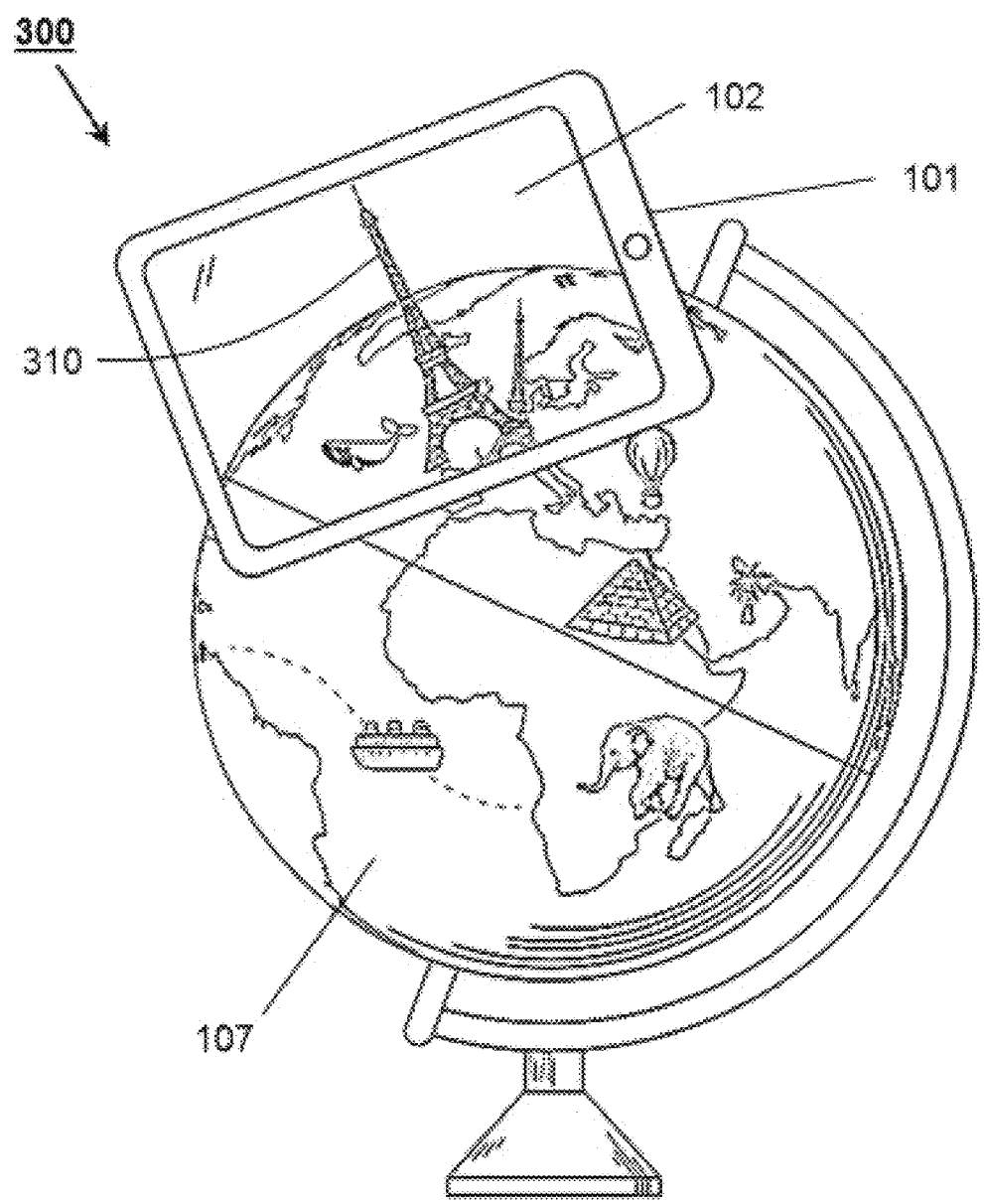
FIG. 3 illustrates a plurality of graphical elements being displayed at a display device, in accordance with an embodiment of the present invention.

FIG. 3 illustrates the plurality of graphical elements 310 (in this case Eiffel Tower) being displayed at the display device 102, in accordance with an embodiment 300 of the present invention. The plurality of graphical elements may be displayed along with the identified geographical region (such as a 3D image of Eiffel Tower being located on a map of Paris, at the display device 102) or individually. It is further envisaged that additional inputs may be received from the user, through the input device 104 and the plurality of graphical elements may then be augmented in response to the additional inputs. The plurality of graphical elements may also be provided with additional features such as 3D animations, videos, audios and text etc.

The additional features may be actuated and controlled in response to the additional inputs. The additional inputs may include, for example, instruction like rotate, pan, zoom, orient, activate animation, activate audio and display text etc. It is also envisaged that the plurality of graphical elements may also be augmented in response to a movement detection of the computing device 101. The movement detection may be facilitated by a plurality of sensors (not shown) available with the computing device 101, such as gyroscopes and accelerometers etc. It is also envisaged that the additional elements, along with the plurality of graphical elements, may also be displayed as being a part of the globe 107, at the display device 102. This may be achieved by integrating the image of the globe 107 with the plurality of graphical elements and/or the additional elements.

Figure 4A:
FIG. 4A illustrates a plurality of graphical elements being displayed at a display device, in accordance with another embodiment of the present invention.

In accordance with another embodiment 400 shown in FIG. 4A, the plurality of graphical elements 310 are displayed at the display device 102 over the geographical region of the United States of America (USA) 402. The plurality of graphical elements 310 include, but not limited to, national flag, famous landmarks, locations, inventions and popular food items associated with the various cities of the USA, for example, Hollywood, telephone, television, iPhone, peanut butter etc. Further, any of the plurality of graphical elements 310 displayed, may be selected by the user to access augmented illustration and information of the selected graphical element. The selection may be made by tapping any of the plurality of graphical elements 310 on the touch input-based display device 102.

Figure 4B:
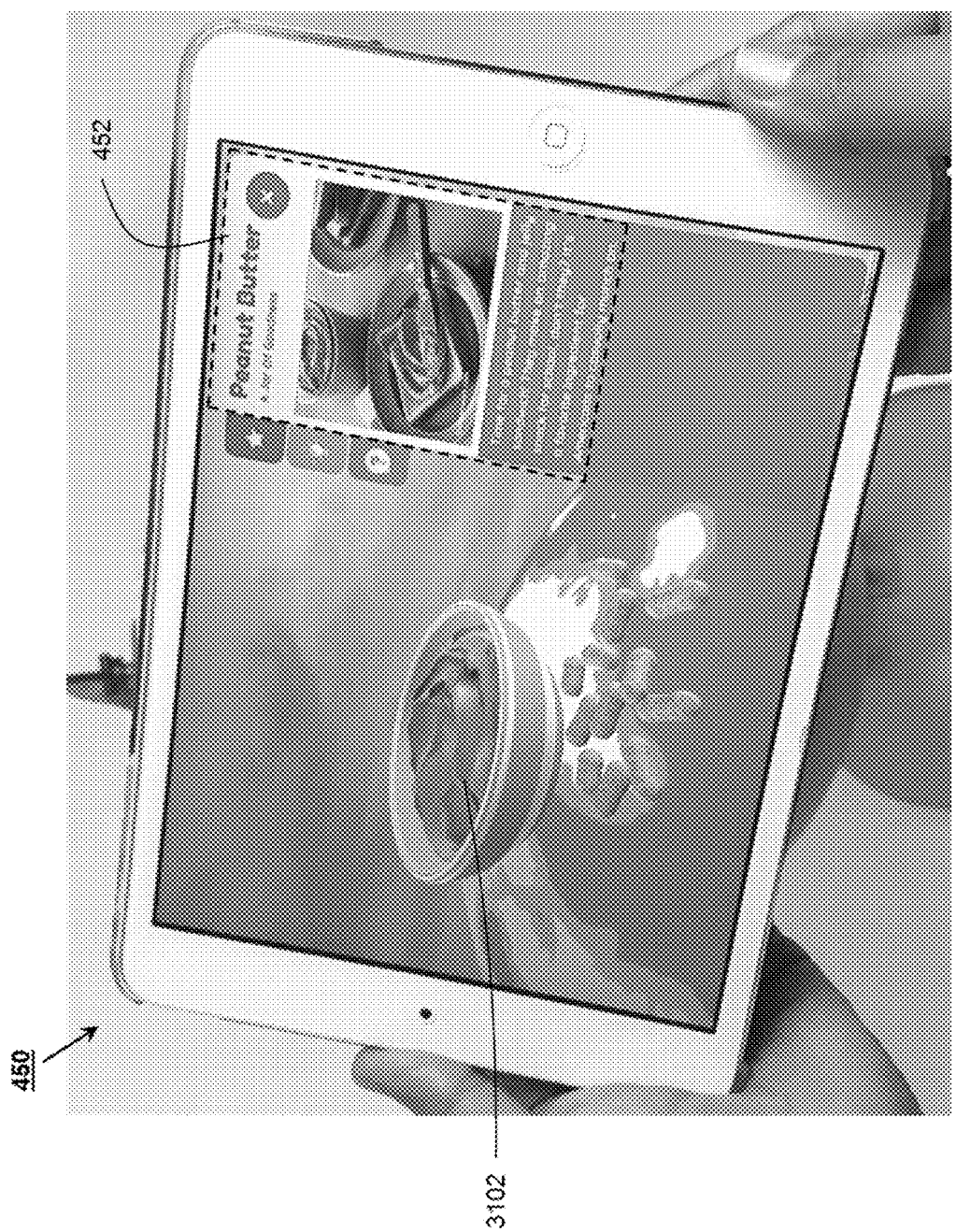
FIG. 4B illustrates selection of a first graphical element from the plurality of graphical elements being displayed in FIG. 4A and display of information related to the first graphical element, in accordance with an embodiment of the present invention.

FIG. 4B illustrates a first graphical element 3102 selected from the plurality of graphical elements 310 being displayed in FIG. 4A, in accordance with an embodiment 450 of the present invention. The first graphical element 3102 here is peanut butter. As previously discussed, the display device 102 enables the user to rotate, pan, zoom, orient and/or animate the first graphical element 3102. Also, an information box 452 is displayed at the display device 102 providing information about peanut butter.

Figure 5A:
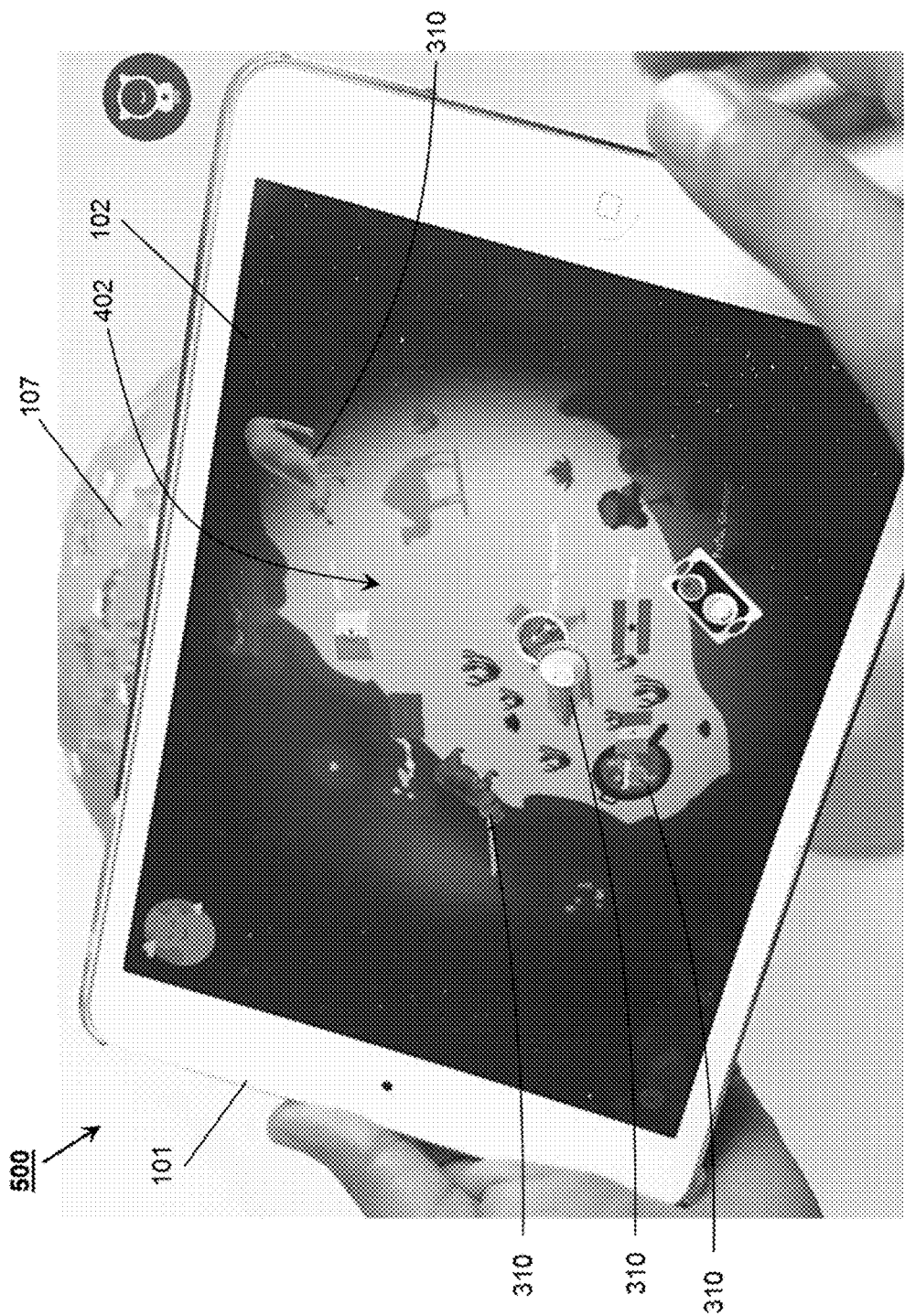
FIG. 5A illustrates a plurality of graphical elements being displayed at a display device, in accordance with another embodiment of the present invention.

In yet another embodiment 500 shown in FIG. 5A, the plurality of graphical elements 310 are displayed on the display device 102 over the geographical region of Africa 502. The plurality of graphical elements 310 include, but not limited to, national flags of the countries in African continent, animals and popular food items associated with the various countries of the Africa. Further, any of the plurality of graphical elements 310 displayed, may be selected by the user to access augmented illustration and information of the selected graphical element. The selection may be made by tapping any of the plurality of graphical elements 310 on the touch input-based display device 102.

Figure 5B:
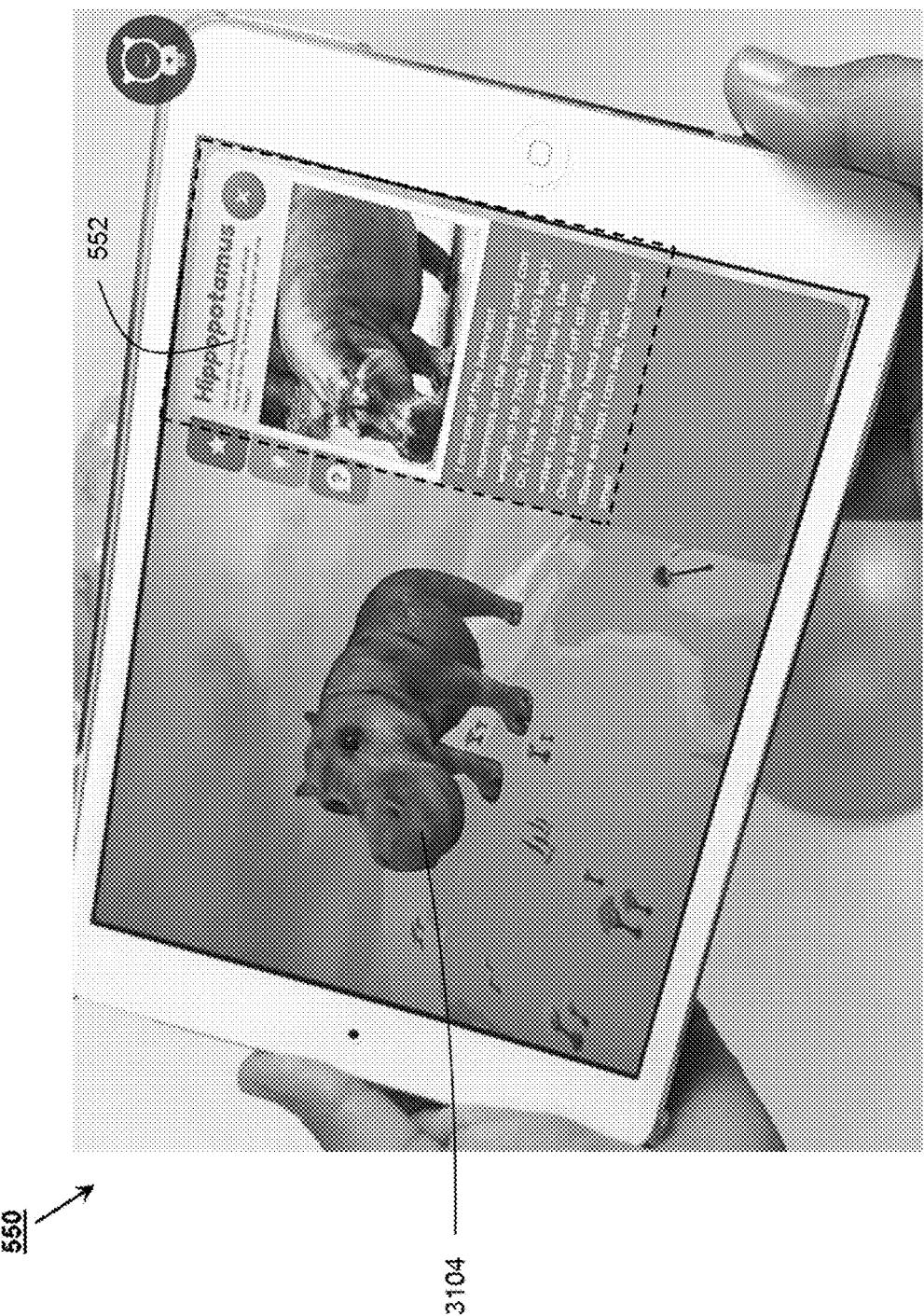
FIG. 5B illustrates selection of a second graphical element from the plurality of graphical elements being displayed in FIG. 5A and display of information related to the second graphical element, in accordance with an embodiment of the present invention.

FIG. 5B illustrates a second graphical element 3104 selected from the plurality of graphical elements 310 being displayed in FIG. 5A, in accordance with an embodiment 550 of the present invention. The second graphical element 3104 is hippopotamus animal. As previously discussed, the display device enables the user to rotate, pan, zoom, orient and/or animate the second graphical element 3104. Also, an information box 552 is displayed at the display device 102 providing information about the hippopotamus.

Figure 6A:
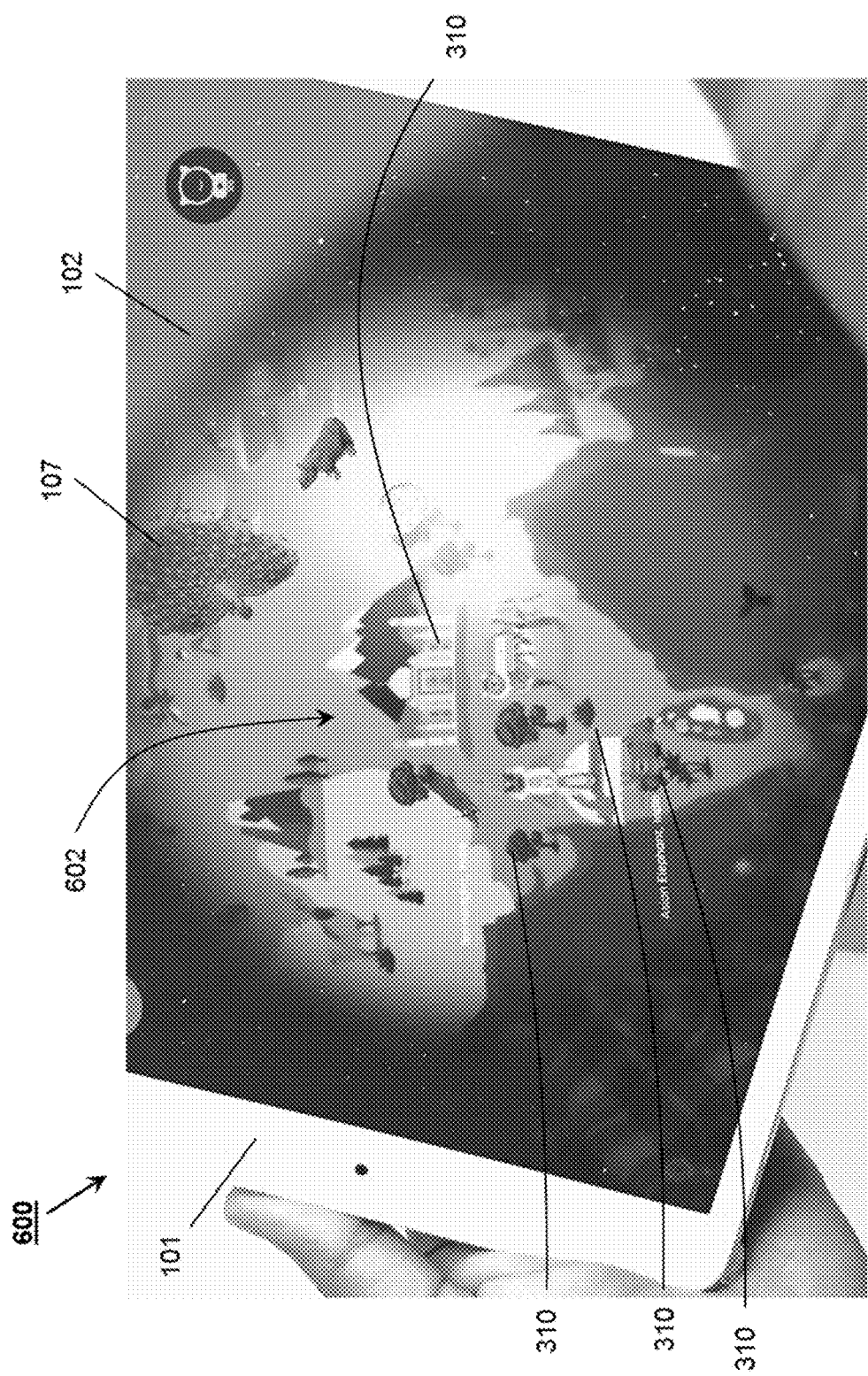
FIG. 6A illustrates a plurality of graphical elements being displayed at a display device, in accordance with another embodiment of the present invention.

In yet another embodiment 600 shown in FIG. 6A, the plurality of graphical elements 310 are displayed on the display device 102 over the geographical region of Asia 602. The plurality of graphical elements 310 include, but not limited to, national flags of the countries in Asia, monuments, locations, birds and animals associated with the various countries of the Asia. Further, any of the plurality of graphical elements 310 displayed, may be selected by the user to access augmented illustration and information of the selected graphical element. The selection may be made by tapping any of the plurality of graphical elements 310 on the touch input-based display device 102.

Figure 6B:
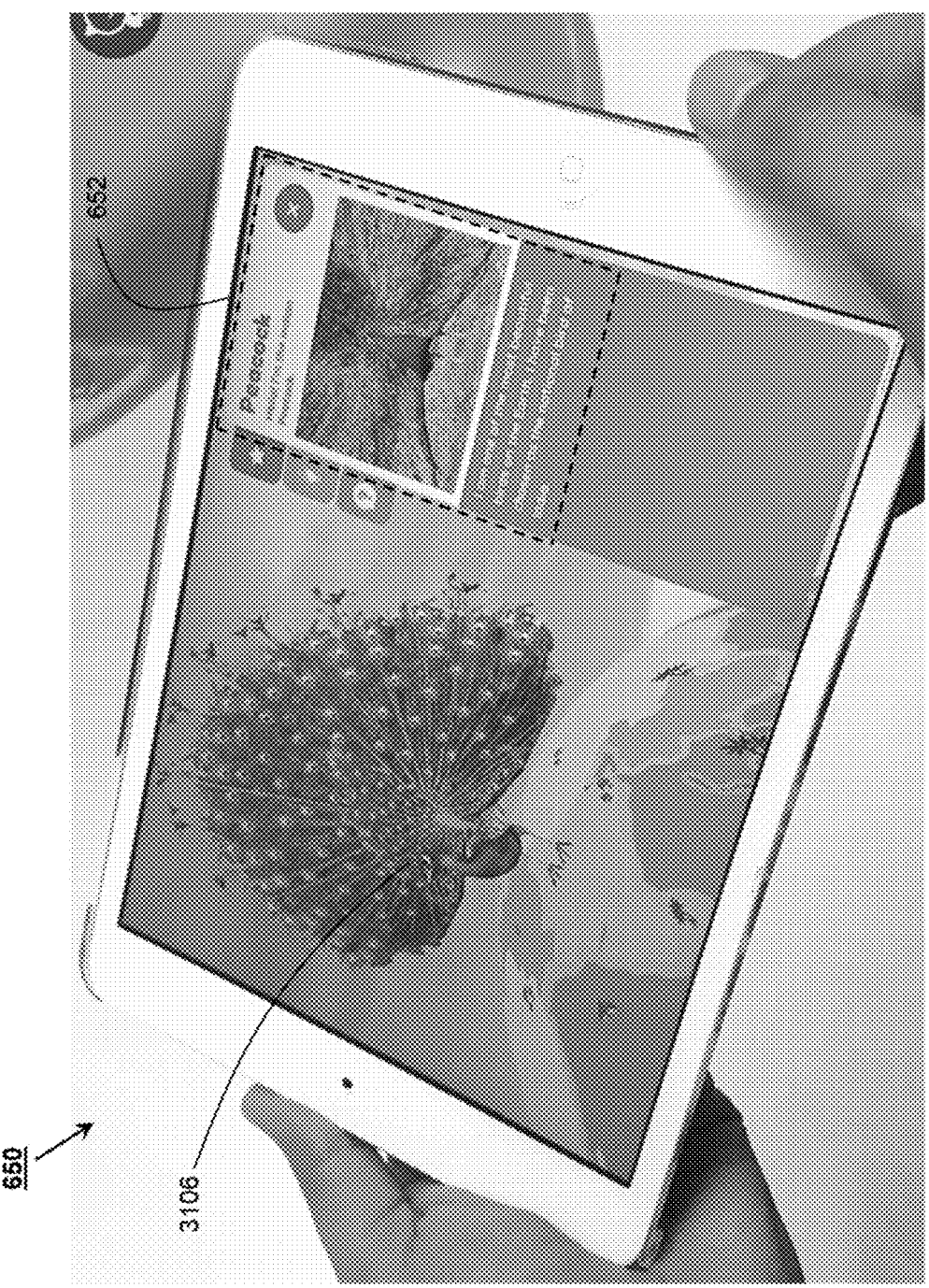
FIG. 6B illustrates selection of a third graphical element from the plurality of graphical elements being displayed in FIG. 6A and display of information related to the third graphical element, in accordance with an embodiment of the present invention.

FIG. 6B illustrates a third graphical element 3106 selected from the plurality of graphical elements 310 being displayed in FIG. 6A, in accordance with an embodiment 650 of the present invention. The second graphical element 3106 is a peacock a bird. As previously discussed, the display device 102 enables the user to rotate, pan, zoom, orient and/or animate the second graphical element 3106. Also, an information box 652 is displayed at the display device 102 providing information about the peacock.

Figure 7A:
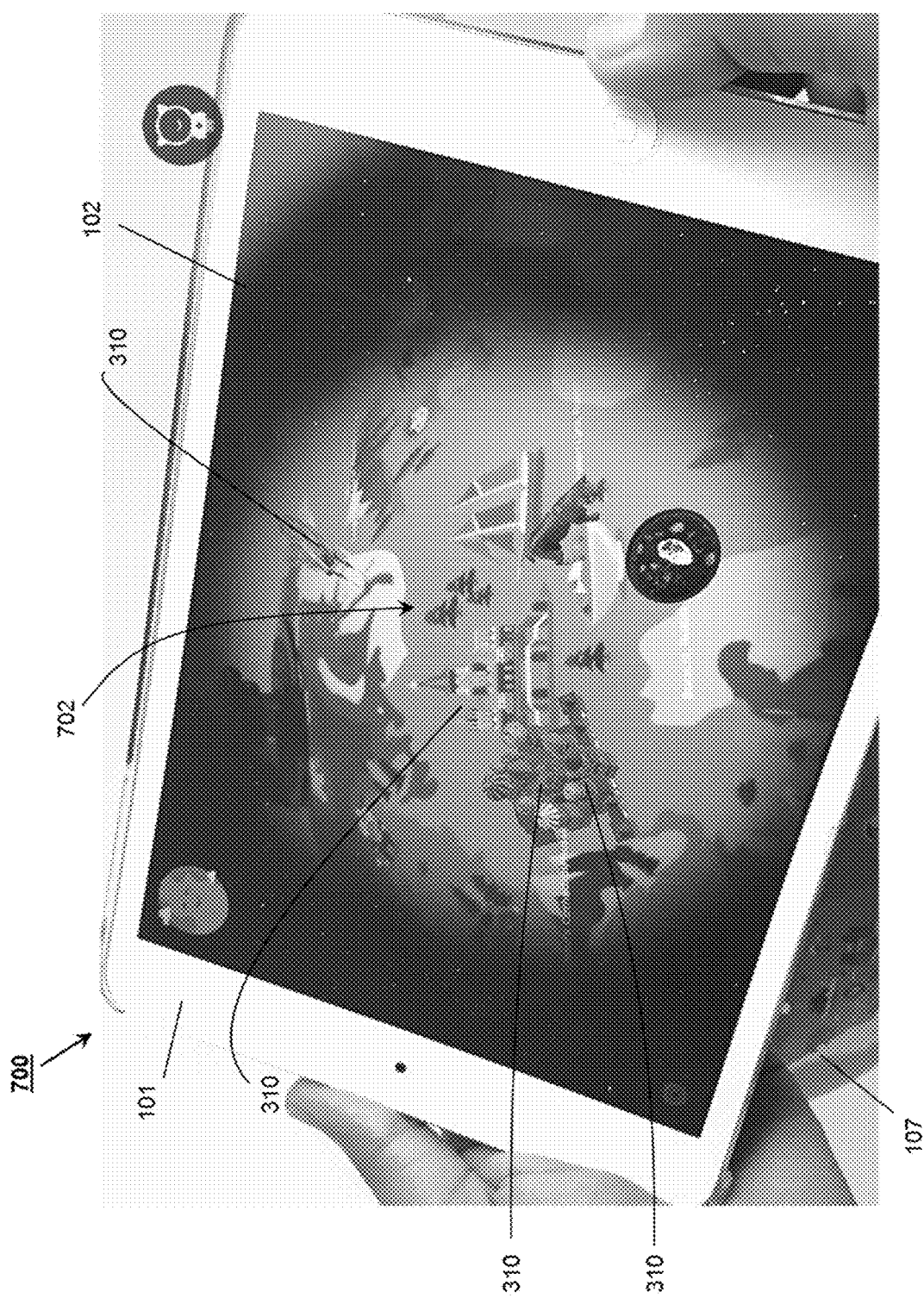
FIG. 7A illustrates a plurality of graphical elements being displayed at a display device, in accordance with another embodiment of the present invention.

In yet another embodiment 700 shown in FIG. 7A, the plurality of graphical elements 310 are displayed on the display device 102 over the geographical region of Russia 702. The plurality of graphical elements 310 include, but not limited to, monuments, landmarks, animals and popular food items of Russia. Further, any of the plurality of graphical elements 310 displayed, may be selected by the user to access augmented illustration and information of the selected graphical element. The selection may be made by tapping any of the plurality of graphical elements 310 on the touch input-based display device 102.

Figure 7B:
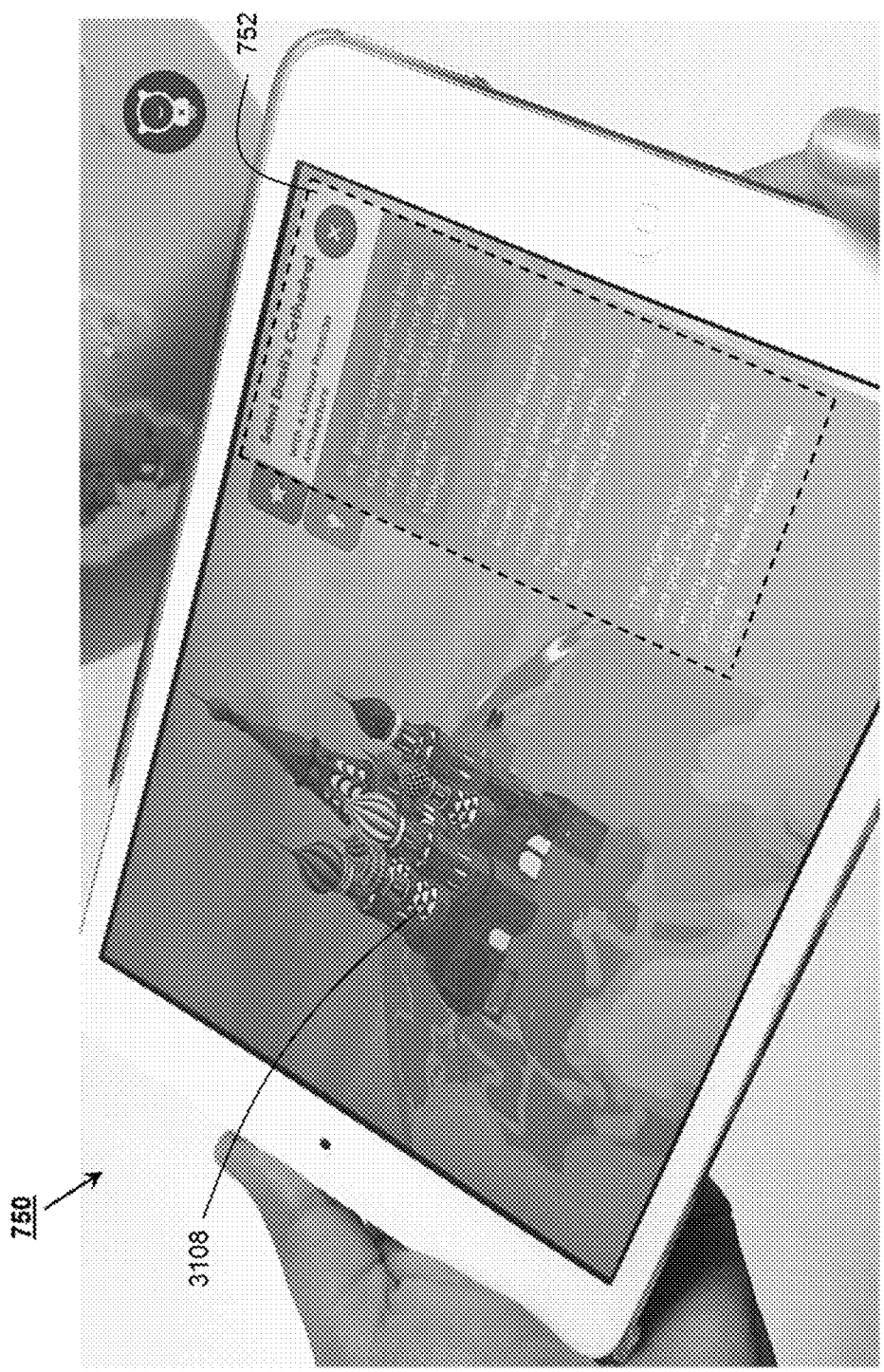
FIG. 7B illustrates selection of a fourth graphical element from the plurality of graphical elements being displayed in FIG. 7A and display of information related to the fourth graphical element, in accordance with an embodiment of the present invention.

FIG. 7B illustrates a second graphical element 3108 selected from the plurality of graphical elements 310 being displayed in FIG. 7A, in accordance with an embodiment 550 of the present invention. The second graphical element 3108 is Saint Basil's Cathedral. As previously discussed, the display device enables the user to rotate, pan, zoom, orient and/or animate the second graphical element 3108. Also, an information box 752 is displayed at the display device 102 providing information about Saint Basil's Cathedral.

Figure 8:
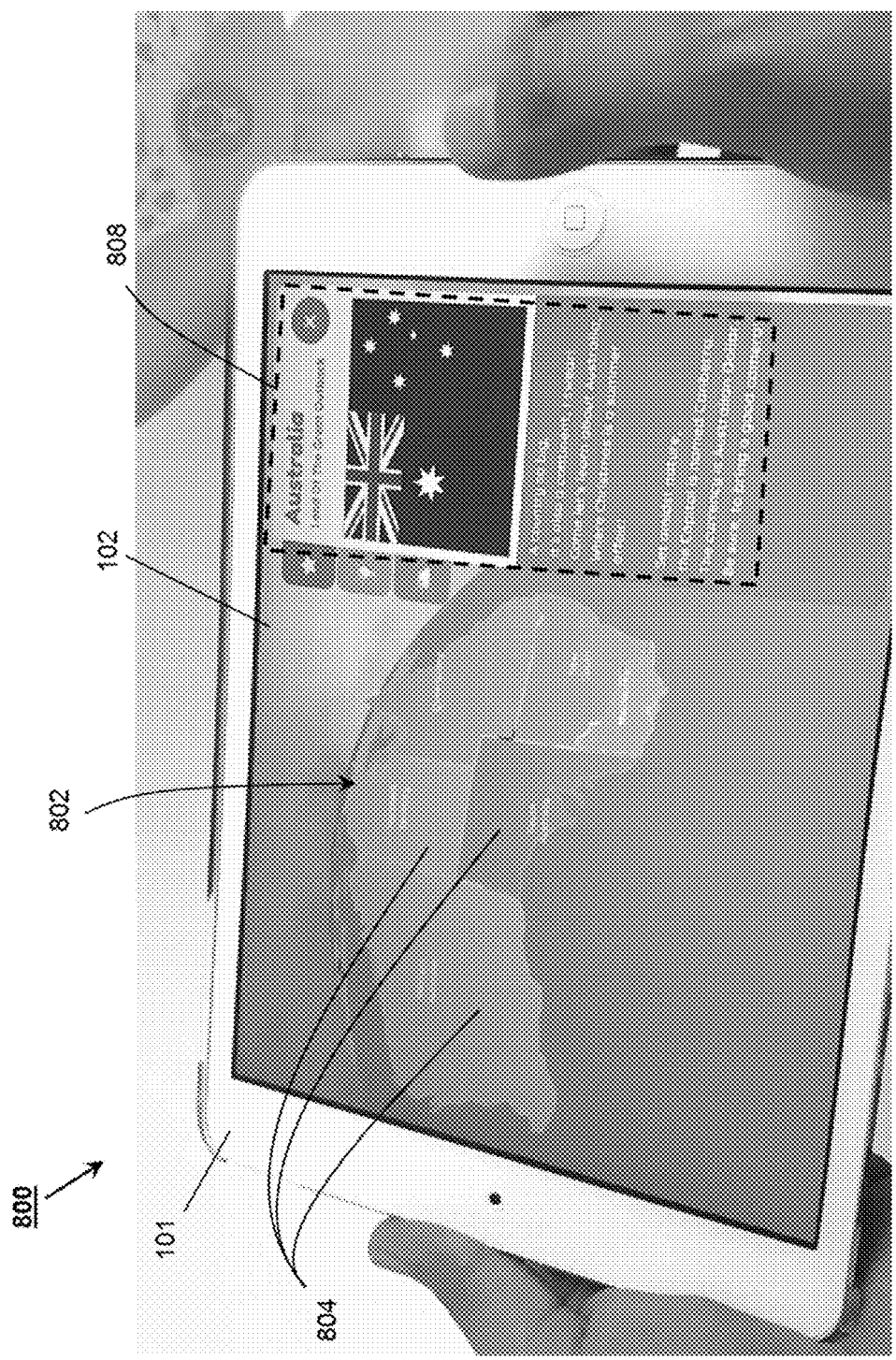
FIG. 8 illustrates a plurality of graphical elements being displayed at a display device, in accordance with another embodiment of the present invention.

In yet another embodiment 800 shown in FIG. 8, a plurality of states 804, for example, Western Australia, South Australia, Queensland, Victoria etc. along with the geographical boundaries are displayed on the display device 102 over the geographical region of Australia 802. Also, an information box 808 is displayed at the display device 102 providing information about the Australia. Further, additional information about weather of the states 804 displayed on the display device 102 may also be provided.

The method steps as described above are capable of being performed by either of the local processor 106 and the server processor 116. For example, in case any portion of the reference data is being accessed locally from the local storage 110, the method steps would be performed by the local processor 106. In case of any portion of the reference data is being fetched from the external storage device 118, through the network 112, the method steps would be performed by any one or both of the local processor 106 and the server processor 116. Additionally, the method steps described above may also be performed through a number of modules as described in the following discussion.

Figure 9:
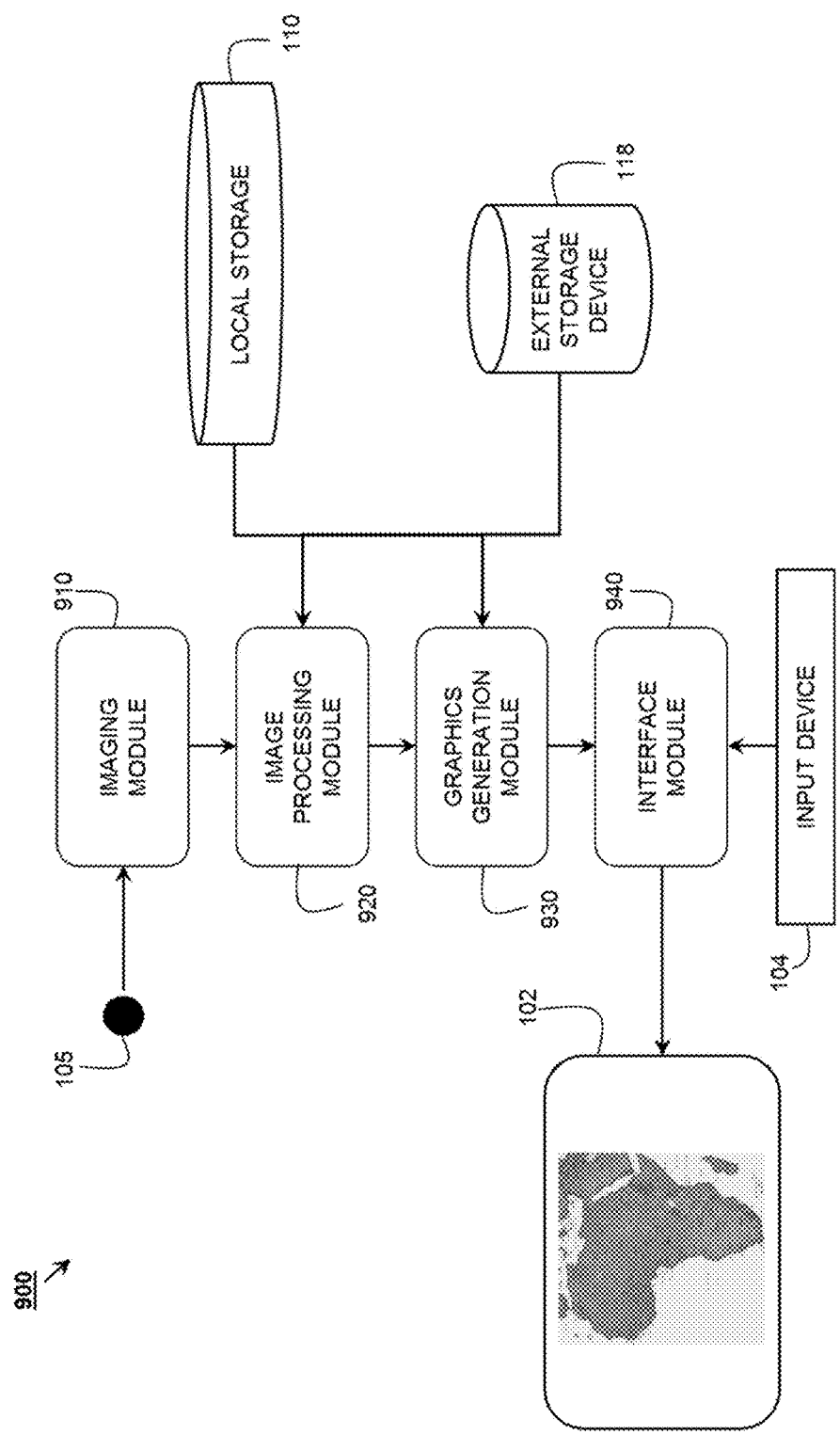
FIG. 9 illustrates a system for enabling augmented reality interactions with a globe, in accordance with an embodiment of the present invention.

FIG. 9 illustrates a system 900 for enabling augmented reality interactions with the globe 107, in accordance with an embodiment of the present invention. The system 900 comprises an imaging module 910, an image processing module 920, a graphics generation module 930 and an interface module 940. The imaging module 910 is configured to receive the image of the portion of the outer shell 1072 of the globe 107, from the image capturing device 105 of the computing device 101. The image processing module 920 is configured identify the geographical region from the image. The graphics generation module 930 is configured to generate the plurality of graphical elements related to the geographical region. The interface module 940 is configured to display the plurality of graphical elements on the display device 102 of the computing device 101.

In accordance with an embodiment of the present invention, the outer shell 1072 is a hollow shell made up of a material selected from a metal or a light weight polymer.

In accordance with an embodiment of the present invention, the outer shell 1072 has the outer surface. The outer surface includes the map of the world having the geographical regions marked out.

In accordance with an embodiment of the present invention, the geographical regions are selected from the group comprising the oceans, the continents, the countries, the states, the cities, the mountain ranges, the plateaus, the grasslands and the rivers.

In accordance with an embodiment of the present invention, the plurality of graphical elements 310 include one or more of 2-Dimensional (2D) and 3-Dimensional (3D) illustrations of entities selected from a group comprising animals, monuments, national flags, landmarks, inventions and foods related to the geographical regions.

In accordance with an embodiment of the present invention, the interface module 940 is further configured to display information related to the plurality of graphical elements 310 on the display device 102 of the computing device 101.

The features can be implemented in a computer system that includes a back-end component, such as a data server or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include a LAN, a WAN and the computers and networks forming the Internet.

The computer system can include clients and servers. A client and server are generally remote from each other and typically interact through a network. The relationship of client and server arises by virtue of computer programs running on the respective computers and having a client-server relationship to each other.

One or more features or steps of the disclosed embodiments can be implemented using an Application Programming Interface (API). An API can define on or more parameters that are passed between a calling application and other software code (e.g., an operating system, library routine, function) that provides a service, that provides data, or that performs an operation or a computation.

The API can be implemented as one or more calls in program code that send or receive one or more parameters through a parameter list or other structure based on a call convention defined in an API specification document. A parameter can be a constant, a key, a data structure, an object, an object class, a variable, a data type, a pointer, an array, a list, or another call. API calls and parameters can be implemented in any programming language. The programming language can define the vocabulary and calling convention that a programmer will employ to access functions supporting the API.

In some embodiments, an API call can report to an application the capabilities of a device running the application, such as input capability, output capability, processing capability, power capability, communications capability, etc.

It should be understood that the techniques of the present disclosure might be implemented using a variety of technologies. For example, the methods described herein may be implemented by a series of computer executable instructions residing on a suitable computer readable medium. Suitable computer readable media may include volatile (e.g. RAM) and/or non-volatile (e.g. ROM, disk) memory, carrier waves and transmission media. Exemplary carrier waves may take the form of electrical, electromagnetic or optical signals conveying digital data steams along a local network or a publically accessible network such as the Internet.

It should also be understood that, unless specifically stated otherwise as apparent from the following discussion, it is appreciated that throughout the description, discussions utilizing terms such as "controlling" or "obtaining" or "computing" or "storing" or "receiving" or "determining" or the like, refer to the action and processes of a computer system, or similar electronic computing device, that processes and transforms data represented as physical (electronic) quantities within the computer system's registers and memories into other data similarly represented as physical quantities within the computer-system memories or registers or other such information storage, transmission or display devices.

It should be noted that where the terms "server", "secure server" or similar terms are used herein, a communication device is described that may be used in a communication system, unless the context otherwise requires, and should not be construed to limit the present invention to any particular communication device type. Thus, a communication device may include, without limitation, a bridge, router, bridge-router (router), switch, node, or other communication device, which may or may not be secure.

It should also be noted that where a flowchart is used herein to demonstrate various aspects of the invention, it should not be construed to limit the present invention to any particular logic flow or logic implementation. The described logic may be partitioned into different logic blocks (e.g., programs, modules, functions, or subroutines) without changing the overall results or otherwise departing from the true scope of the invention. Often, logic elements may be added, modified, omitted, performed in a different order, or implemented using different logic constructs (e.g., logic gates, looping primitives, conditional logic, and other logic constructs) without changing the overall results or otherwise departing from the true scope of the invention.

In general, the word "module," as used herein, refers to logic embodied in hardware or firmware, or to a collection of software instructions, written in a programming language, such as, for example, Java, C, or assembly. One or more software instructions in the modules may be embedded in firmware, such as an EPROM. It will be appreciated that modules may comprised connected logic units, such as gates and flip-flops, and may comprise programmable units, such as programmable gate arrays or processors. The modules described herein may be implemented as either software and/or hardware modules and may be stored in any type of computer-readable medium or other computer storage device.

Further, while one or more operations have been described as being performed by or otherwise related to certain modules, devices or entities, the operations may be performed by or otherwise related to any module, device or entity. As such, any function or operation that has been described as being performed by a module could alternatively be performed by a different server, by the cloud computing platform, or a combination thereof.

A number of embodiments have been described. Nevertheless, it will be understood that various modifications may be made. Elements of one or more embodiments may be combined, deleted, modified, or supplemented to form further embodiments. As yet another example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

We claim:

1. A method for enabling augmented reality interactions with a globe comprising the steps of:
   receiving an image of a portion of an outer shell of the globe, from an image capturing device of a computing device;
   identifying, by one or more processors, a geographical region from the image;
   providing an alert to a user if no geographical region is identified to enable the user to reorient the computing device or the globe for capturing an appropriate image of the portion of the globe from the image capturing device:
   generating a plurality of graphical elements related to the geographical region;
   displaying the plurality of graphical elements on a display device of the computing device; and
   receiving additional inputs from the user, through an input device, to augment the plurality of graphical elements in response to the additional inputs for displaying information of one or more of the plurality of graphical elements.

2. The method as claimed in claim 1, wherein the geographical region is selected from the group comprising oceans, continents, countries, states, cities, mountain ranges, plateaus, grasslands and rivers.

3. The method as claimed in claim 1, wherein the plurality of graphical elements includes one or more of 2-Dimensional and one or more 3-Dimensional illustrations of entities selected from a group comprising animals, monuments, national flags, landmarks, inventions and foods related to the geographical region.

4. The method as claimed in claim 1, further comprising a step of displaying information related to the plurality of graphical elements on the display device of the computing device in a cascading manner.

5. A system for enabling augmented reality interactions with a globe comprising:
   a computing device configured for augmented reality interactions with the globe comprising:
   an image capturing device configured to capture an image of the portion of an outer shell of the globe;
   one or more processors configured to execute the steps of:
      identifying a geographical region from the image upon comparing the image with a reference data;
      providing an alert to a user if no geographical region is identified to enable the user to reorient the computing device or the globe for capturing an appropriate image of the portion of the globe from the image capturing device:
      generating a plurality of graphical elements related to the geographical region;
   a display device configured to display the plurality of graphical elements on the display device; and
   an input device configured to receive additional inputs from a user to augment the plurality of graphical elements in response to the additional inputs for displaying information of one or more of the plurality of graphical elements, wherein the input device is integrated into a capacitive or a resistive or an equivalent touch-based screen device.

6. The system as claimed in claim 5, wherein the computing device configured for augmented reality interactions with the globe is selected from a group of a mobile handheld device, a PDA, a desktop, a laptop or a tablet.

* * * * *